United States Patent
Merritt et al.

[11] 3,892,485
[45] July 1, 1975

[54] MONITORING APPARATUS FOR MEASURING PARTICLES SUSPENDED IN LIQUID AND FOR MEASURING THE OPACITY OF THE LIQUID

[75] Inventors: Robert Bruce Merritt, Sharonville; Norbert John Hester, Cincinnati, both of Ohio

[73] Assignee: General Electric Company, Wilmington, Mass.

[22] Filed: May 6, 1974

[21] Appl. No.: 467,286

[52] U.S. Cl. .................. 356/103; 250/574; 356/70; 356/208
[51] Int. Cl. .......................................... G01n 21/22
[58] Field of Search ...... 356/208, 103, 70; 250/573, 250/574

[56] References Cited
UNITED STATES PATENTS

| | | | |
|---|---|---|---|
| 3,618,061 | 11/1971 | Livers | 356/208 X |
| 3,745,350 | 7/1973 | Hill et al. | 356/208 X |

*Primary Examiner*—Palmer C. Demeo

[57] ABSTRACT

This invention relates to a portable monitoring apparatus for detecting wear particles which may be suspended in a liquid such as the lubricating oil of turbine engines and for detecting changes in the opacity of the oil. The oil sensor which may be inserted directly into the lubrication system of the engine consists of a sensor assembly having a chamber or U-shaped channel into which the oil flows. A light emitting, solid state lamp and a first photodiode are positioned on opposite sides of the channel or chamber so that the photodiode measures the attenuation of the light passing through the oil. A second photodiode is placed at a 90° angle to the light beam to measure light scattered by wear particles suspended in the oil. The signals from the two photodiodes are processed and displayed to provide an indication of the degree of attenuation of the light beam due to changes in opacity and of the magnitude of the scattered light which is a measure of the amount of wear debris in the oil. The opacity of the oil is measured without directly sensing the degree of light attenuation. That is, illumination of the scatter field of view and of the first photodiode is kept constant by varying the light emission from the lamp through a closed loop control system. The change in the lamp supply voltage necessary to maintain illumination level constant is thus a measure of the light attenuation due to changes in opacity. Furthermore, by maintaining a constant illumination level in the scatter field of view, errors in the scatter output indication are avoided. That is, in the absence of a constant light level in the scatter field of view, the amount of light scattered by a given concentration of particles varies with the opacity of the oil. As opacity increases, attenuation increases and the scattered light decreases. This results in decreased output from the scatter photodiode giving an erroneous indication that there has been a reduction in the particle concentration whereas the actual reduction of the output from scatter photodiode is due to the darkening color of the oil. By maintaining constant illumination in the scatter field of view through a closed control loop which varies the light output of the lamp, an accurate measurement of the particle concentration is made possible by eliminating errors which are brought about by changes in the opacity of the oil.

8 Claims, 3 Drawing Figures

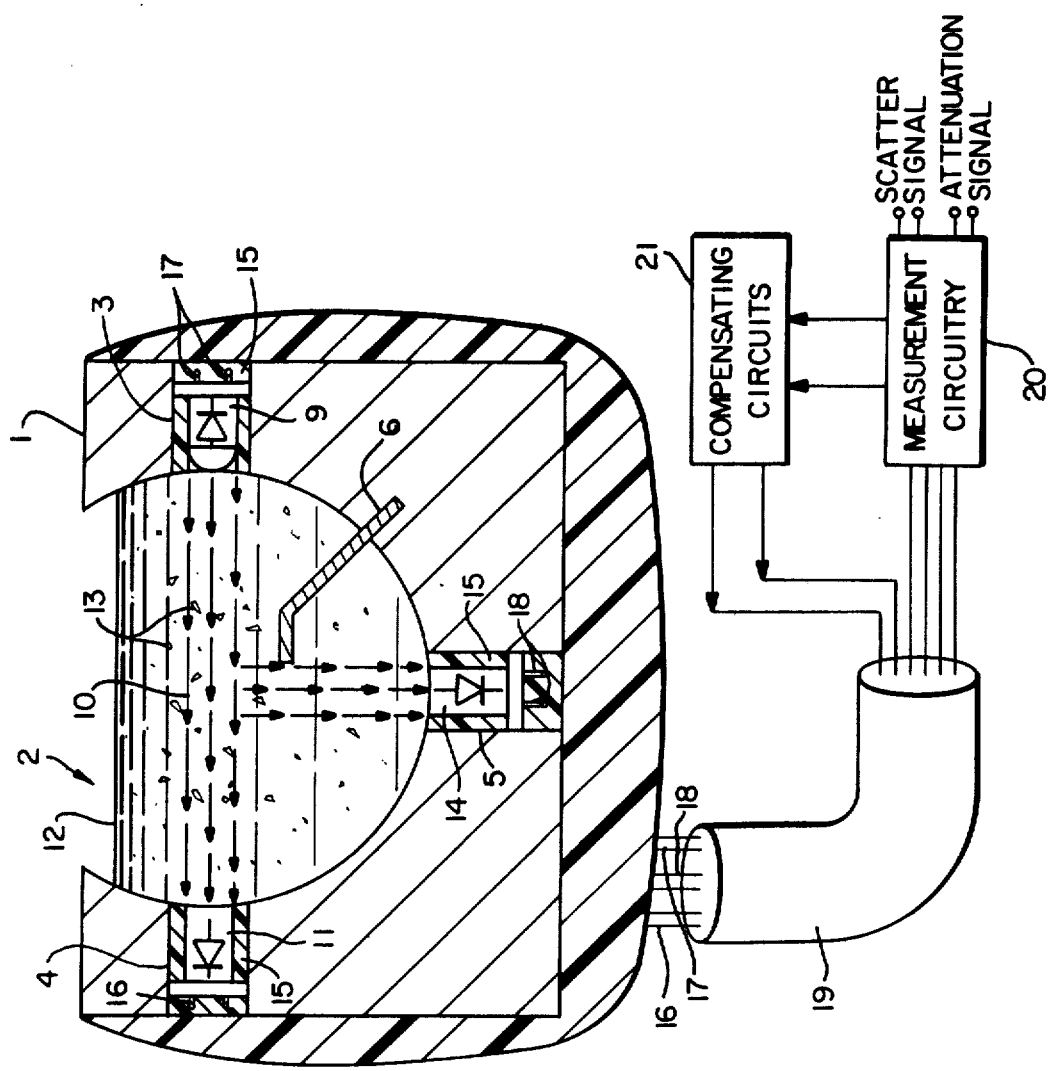
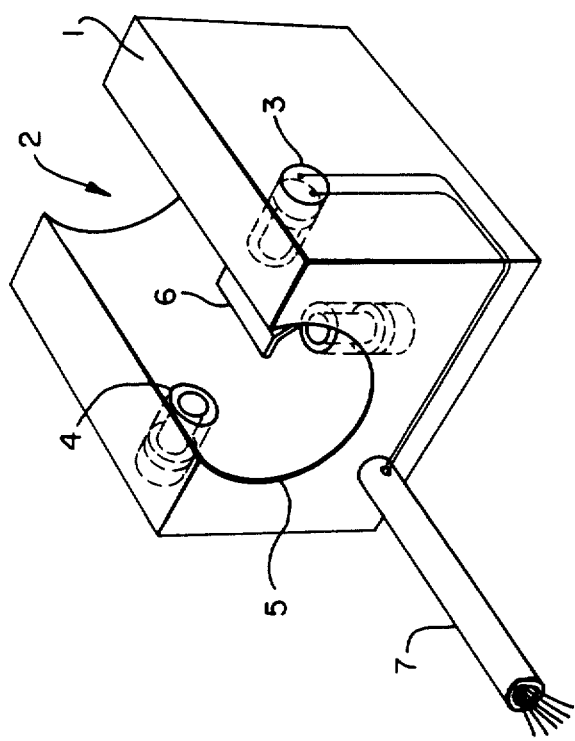
FIG. 1
FIG. 2

MONITORING APPARATUS FOR MEASURING PARTICLES SUSPENDED IN LIQUID AND FOR MEASURING THE OPACITY OF THE LIQUID

The instant invention relates to an apparatus for monitoring the condition of an engine oil stream and more particularly, to a probe which may be inserted directly in the oil stream to determine the contamination of the oil stream both from the standpoint of thermal degradation of the oil and for measuring the particle contamination in the oil stream.

The measurement of contamination in engine oil is a continuing and long-term problem, particularly in the field of aircraft engines. Rapid and accurate determination of changes in the engine lubricating oil characteristics is important in the early detection of the onset of failure of oil-wetted parts or components of a turbine engine. Thus, changes in the color or opacity of the oil are usually an indication that the oil is sludging or has undergone chemical degradation due to excessive temperatures in the engine. The presence of wear debris in the form of particles suspended in the oil may be an indication that there is excessive engine wear. In the past, various techniques have been utilized to measure chemical degradation of the oil and to measure particle contamination in the oil. Thus, one of the prior art techniques simply involves taking samples of oil from the engine and submitting them to spectographic analysis. This approach is time consuming, expensive and not entirely satisfactory in application. Therefore, a need exists for a simple, compact, and accurate sensor which will allow in situ oil monitoring by inserting the sensor directly into the lubrication system of the engine to provide information about the attenuation characteristics of the oil and the particle concentration. By measuring these two characteristics simultaneously, an indication is provided both of thermal degradation of the oil due to overtemperature conditions in the engine as well as wear in the engine due to faulty lubrication or other conditions.

In the past, approaches other than sampling and laboratory examination by spectroscopic means have been suggested to measure oil or liquid contamination. In one such approach, the light attenuating characteristics of the oil have been utilized to determine changes in the oil condition and hence contamination. U.S. Pat. No. 3,578,865, issued May 18, 1971, and entitled "Method and Apparatus for Photoelectrically Monitoring Degradation of an Oil Stream," shows such a system in which a beam of light is transmitted through the oil and the transmission characteristics of the oil is measured by a photosensor. The degree of attenuation produced by the oil is then an indication of the contamination. While this technique can be useful in many circumstances, it is limited in its application since contamination by wear particles is not measured accurately. That is, the attenuation of the light may be due both to wear particles as well as thermal degradation of the oil and it is not clear the degree to which the attenuation is due to wear particle or thermal degradation.

Alternatively, other approaches have been proposed for measuring particle concentration in a stream which are based on measuring scattered or reflected light. U.S. Pat. Nos. 3,364,812, 3,665,201, 3,713,743, 3,714,444, 3,734,629 all show systems in which light scattering (either forward scattering, back scattering or scattering at right angles) is utilized to measure the turbidity or particle concentration in a fluid. None of these patents, however, provide arrangements in which both the light transmission characteristics as well as light scattering by particles are sensed to indicate both the presence of wear debris in the oil as an indication of engine wear, and change in opacity as an indication of the thermal degradation of the oil. Hence, these arrangements, though useful in many ways, do not provide the complete information about the characteristic of the engine, that is often desired in order to provide early warning or indication of changes in engine condition.

Yet another prior art approach as shown in U.S. Pat. No. 3,450,886 contemplates the measurement of particle concentration in a fluid by measuring the attenuation of the light through the sample and measuring the scattered light to provide compensation for the color or opacity of the suspending liquid. In this approach, the scattered light signal is utilized to modify the attenuated light signal to compensate for changes in opacity.

In yet another suggested approach as shown in U.S. Pat. No. 3,734,629, the scattered light is measured to indicate the presence of particles in a fluid and the attenuated light is utilized to vary the scattered light signal to compensate for any changes in the ambient light source due to aging or variations in the supply voltage source. This arrangement, however, does not provide information about opacity of the oil (and hence the effects of thermal degradation) as well as information about the particle concentration. Furthermore, systems of this type are inherently subject to error since any change in the opacity of the oil due to thermal degradation, for example, results in increased attenuation of the light which automatically reduced the amount of scattered light since there is less light to be reflected by the particles. Consequently, the output from the light sensing device position to pick up the scattered light is automatically reduced resulting in an apparent but false indication of a reduction in the particle concentration.

Applicant has found that it is possible with a single device to determine both the particle concentration as well as the degree of thermal degradation, while at the same time, preventing erroneous indications of particles concentration due to changing light transmission characteristics of the oil. Applicant's approach involves maintaining constant illumination of the scatter field of view and of the directly illuminated photodiode through a closed loop circuit which controls the energizing voltage to the light source as a function of the light attenuation. In this fashion, as the light transmission characteristics of the oil change with thermal degradation thereby causing increased light attenuation, the supply voltage to the lamp is increased to increase the light output thereby maintaining illumination of the scatter field of view and of one photodiode constant. The control signal for varying the light output as a function of light attenuation is utilized to produce an output indication of the attenuation produced due to changes in the opacity of the oil. Simultaneously, by maintaining the illumination in the scatter field of view constant, the indication from the scatter photodiode is not adversely affected by the change in the transmission characteristic of the oil thereby eliminating errors in determining the particle concentration due to changes in opacity of the oil caused by thermal degradation.

It is therefore a primary objective of this invention to provide a liquid monitoring apparatus capable of determining simultaneously both the particle contamination of the liquid as well as changes in opacity.

A further objective of this invention is to provide an oil contamination monitoring apparatus capable of simultaneously determining wear particle contamination in the oil and degradation of the oil through sludging a thermal degradation.

Another objective of this invention is to provide an oil contamination monitor in which changes in opacity of the oil are measured indirectly.

Yet another objective of the invention is to provide an oil contamination monitoring apparatus in which the particle concentration in the oil may be determined accurately and quickly without errors introduced due to changes in the light transmission characteristic of the oil.

Other objectives and advantages of the instant invention will become apparent as the description thereof proceeds.

The various objectives and advantages of the instant invention are realized in an arrangement for measuring the contamination level of a liquid such as oil from an engine by producing a varying intensity light beam which is projected through the oil to be sampled. A suitable radiation responsive element such as a photodiode is positioned directly in the transmission path to receive the transmitted light. A further photodiode is positioned at 90° to the main light path to receive light scattered by particles suspended in the oil stream. The output from the photodiode in the direct path is part of a closed loop system which controls the energizing voltage applied to the light source. By means of this closed loop, the light intensity is varied as a function of the light transmission characteristics of the oil (i.e., oil opacity) so that the illumination of the photodiode and the scatter field of view is maintained constant. Thus, as the oil becomes darker due to thermal degradation, thereby increasing the attenuation of the light, the loop produces an error or control signal which increases the supply voltage to the light source thereby increasing the light emission and maintaining the illumination constant. The error or control signal in the closed loop therefore varies as a function of the attenuation and may be used to determine the transmission characteristics of the oil.

The novel features which are believed to be characteristic of this invention are set forth with particularity in the appended claims. The invention itself, however, both as to its organization and method of operation, may best be understood by reference to the following description taken in connection with the accompanying drawings wherein:

FIG. 1 is a perspective view of the oil monitor assembly;

FIG. 2 is a sectional view of the oil monitor assembly showing the positioning of the photo sensors and the light sources;

Figure 3:
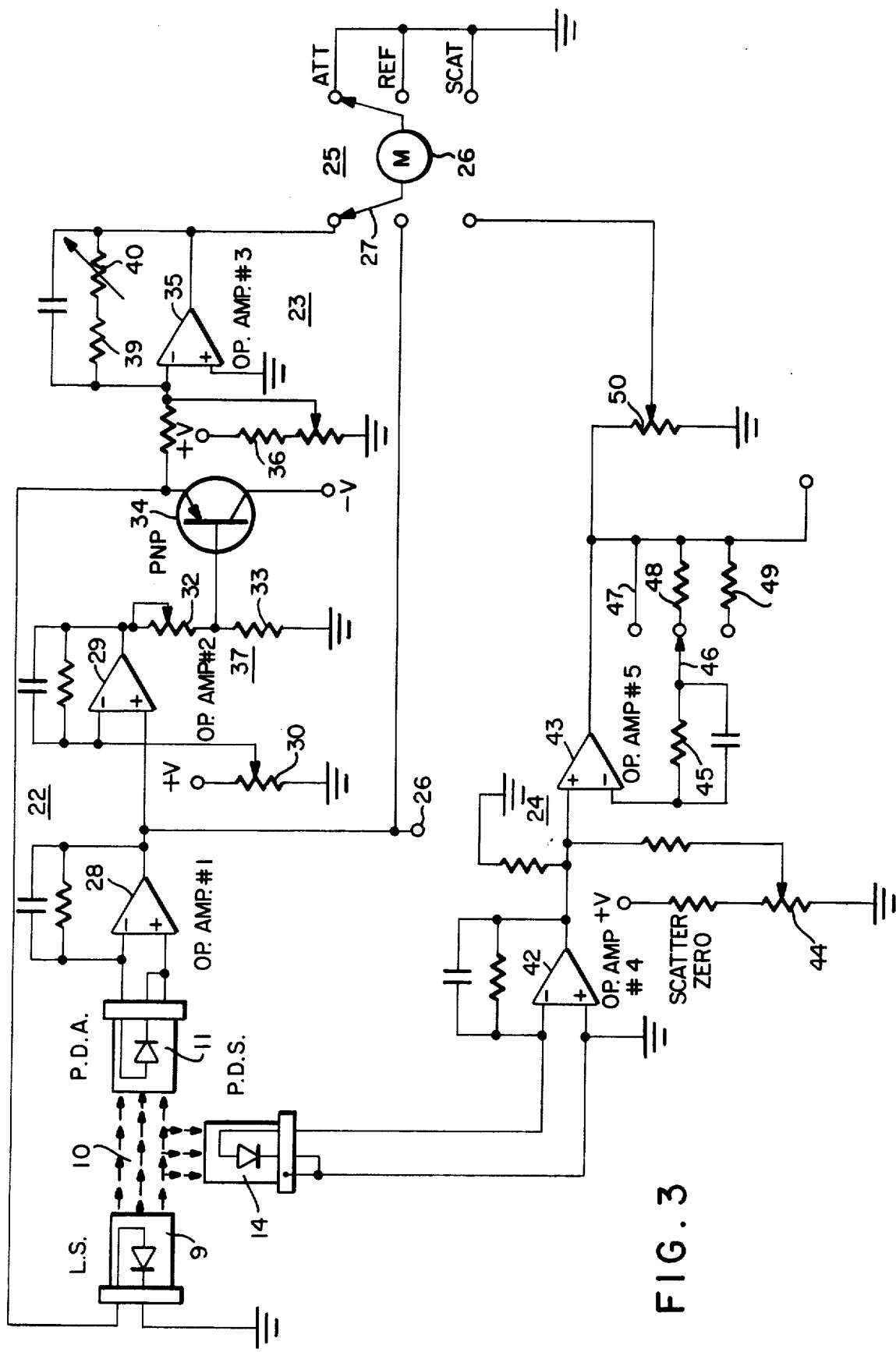
FIG. 3 is a schematic block diagram of the electronic circuitry for processing the output from the sensor to produce an indication of the oil condition.

One embodiment of the oil sensor assembly incorporating the invention is illustrated in the partial perspective of FIG. 1 and includes an oil monitor probe which may be directly inserted into an oil stream of an engine or into an oil sample to determine the wear particle concentration as well as the opacity of the oil. Oil monitor probe includes an elongated metal block or head 1 having a cylindrical chamber or U-shaped oil channel 2 which is filled with oil when the assembly is inserted in an oil stream or sample. The oil in channel 2 is monitored by sensing both light attenuation and light scatter to determine the particle concentration in as well as the opacity of the oil. It can be seen that the probe by its construction can be used to test oil in situ by simply dipping the sensor directly into the oil and reading the output on a meter, presently to be described. Bore holes 3 and 4 project through the side walls and communicate with oil channel 2. An infrared solid state light source is positioned in bore hole 3 and a light responsive element such as a photodiode is positioned in bore hole 4 to measure the light attenuation through the oil. Bore hole 5 is positioned in the base of channel 2 and supports an additional light responsive photodiode to measure light scattered by particles suspended in the oil as a measure of the concentration of particles contained in the oil. A shield 6 is positioned in channel 2 between the light emitting diode in bore hole 3 and the photodiode in bore hole 5. Shield 6 is positioned between these elements to block direct transmission of light from the infrared emitting diode in bore hole 3 to the photodiode sensor in bore hole 5 to insure that the only light scattered from particles in the lubricating oil is detected by the diode in bore hole 5 and erroneous indications due to the direct transmission of light are avoided. A flexible, hollow rod or handle 7 is attached to probe 1. The leads, not shown, from the photodiode sensors and the photodiode light emitting element are brought to the exterior of probe 1 and into the interior of the handle 7 through a suitable opening adjacent to the sensor element 1. A cable, also not shown, is connected to handle 7 and to the signal processing, measuring and display systems for producing a visual indication of the particle concentration and the opacity of the oil.

FIG. 3 shows a sectional view of the oil monotor probe of FIG. 1 with the section taken through bore hole 3, 4 and 5 to illustrate clearly the manner in which the various elements are mounted. A radiation source such as solid state infrared lamp 9 is positioned in bore hole 3 to produce a beam of radiant energy 10 in the infrared wave length which is projected across the channel to a photodiode 11 positioned in bore hole 4. The beam of infrared light in passing through the oil 12 is attenuated with the degree of attenuation depending on the opacity of the oil. Part of radiant energy beam 10 is scattered by particles 13 which may be suspended in the oil sample 12. These particles are wear debris from the engine and the concentration of these particles is an indication of engine wear and changes in particle concentration can be utilized to permit detection of incipient failure of oil-wetted parts of a turbine engine thereby allowing preventive maintenance at a minimum cost.

Particles 13 scatter the light at right angles to the beam path and this scattered light is intercepted by a second photodiode 14 positioned in bore hole 5. The photodiodes as well as the exterior of probe 1 are encapsulated in a suitable resin 15 which may be any resin which is resistant to turbine oil. Output leads 16, 17 and 18 from the lamp and photodiodes are brought out through the handle of the unit, not shown in FIG. 2, to a cable 19 and thence to a measurement and display circuit shown generally at 20, presently to be described in detail in connection with FIG. 3. One output of the measuring and display circuit is an indication of the scattered light and hence the particle concentration. A second output is representative of the light attenuation in the oil; with the degree of light attenuation providing a measure either of thermal degradation due to excessive engine temperature or of oil sludge.

As pointed out previously, measurement of the light attenuation and hence the thermal degradation is indirect. That is, the intensity of the light from lamp 9 is varied to maintain the light in the scatter field and illumination of the photodiode 11 constant as the transmission characteristic of the oil changes. Thus, as the opacity changes and the oil becomes darker due to thermal degradation, the attenuation of the light beam in passing through the oil increases. This change in the output from photodiode 11 is sensed and utilized through compensation network 21 to increase the energizing voltage to lamp 9. This correspondingly increases the intensity of the light beam so that the light in the scatter field and the light illuminating photodiode 11 remains constant even though the transmission characteristic of the oil has changed. This compensation is achieved by a closed loop system, presently to be described in connection with FIG. 3.

The error or control signal in the servoloop necessary to vary the output of the lamp is thus an indication of the attenuation of the light and this signal is then processed further and displayed to provide an indication of the attenuation of the light and hence, of the thermal degradation of the oil. By thus providing an indirect measure of the transmission characteristic of the oil, rather than measuring light attenuation directly, one additional important benefit is provided in that the system is no longer sensitive to variations in supply voltage, changes in light output due to aging of the lamp, etc. Any changes in supply voltage or in the lamp output due to aging of the lamp is automatically compensated for to maintain the light in the scatter area and the illumination of photodiode 11 constant. In addition, by varying the light output of the lamp so as to maintain the illumination of the photodiode and the light in the scatter area constant even as the opacity of the oil changes due to thermal degradation, the possibility of an erroneous indication of the particle concentration is minimized or eliminated. That is, if the light output from the lamp is constant, the increased light attenuation as the oil darkens correspondingly decreases the amount of light scattered and intercepted by the photodiode simply because the amount of light available in the scatter field of view is less and not because the number of particles is less. Nevertheless, the reduced output from photodiode 14 seemingly indicates that the particle concentration has been reduced. By means of the instant arrangement, however, the light level in the scatter field of view is maintained constant by increasing the output of the lamp with changes in the oil opacity thereby eliminating errors in the scattering photodiode output due to changes in the transmission characteristics of the oil.

FIG. 3 is a circuit diagram of the measurement, display and compensating circuitry for varying the output of the lamp to maintain illumination of the scatter field of view and the attenuating photodiode constant even though the opacity of the oil varies. As shown schematically, the solid state, infrared emitting photodiode, lamp 9, produces an infrared light beam 10 which is projected through the oil to photodiode 11. A second photodiode 14 is positioned at right angles to light beam 10 and receives light scattered by particles in the oil to provide a measure of the particle concentration and contamination of the oil. Connected to the output of the attenuating diode 11 is a first closed lamp energization control loop 22 which controls lamp 9 to vary the light output so as to maintain the light intensity in the scatter field of view and the illumination of attenuating diode 11 constant even though the opacity of the oil may change due to thermal degradation or the presence of sludge. Coupled to closed control loop 22 is an attenuation measurement path 23 which senses the error or control signals in closed loop 22 and utilizes this control signal as a measure of light attenuation and hence of the change in opacity of the oil. Light scatter signal path 24 is coupled to the output of photodiode 14 and processes the signals from this sensor to produce an indication of the particle concentration in the oil stream. Signal processing paths 23 and 24 are coupled to a display means 25 which may include a meter 26 and a multi-position switch 27 to indicate selectively the degree of attenuation and light scattering as a measure of the oil opacity and the particle concentration in the oil respectively. Alternately, the process signals from paths 23 and 24 may be applied over separate terminals for remote reading and recording.

Lamp energization control loop 22 includes a first operational amplifier 28 coupled directly to the output of photodiode 11. The output from photodiode 11 is coupled to the inverting terminal of operational amplifier 28 with the non-inverting terminal being connected to ground. The output of operational amplifier 28 is connected to the non-inverting terminal of a second operational amplifier 29 which has a positive voltage from a lamp reference voltage potentiometer 30 applied to the inverting terminal. The output from operational amplifier 29 is coupled through voltage divider 37 which includes a rheostat 32 and a fixed resistor 33 to the base of a lamp energization control transistor 34. Control transistor 34 is a PNP transistor having its collector connected to a source of negative potential and its emitter to the infrared emitting photodiode lamp 9. The voltage at the base of transistor 34 controls the conductivity of this transistor and hence the supply voltage to photodiode 9. As the output of operational amplifier 29 varies, the conduction of transistor 34 varies correspondingly to vary the supply voltage to lamp 9 and maintain the light intensity in the scatter field of view and the light illumination for the diode 11 constant even though the opacity of the oil may change. Rheostat 32 is provided to limit the emitter current from transistor 34 and thereby to prevent lamp burnout if the output from photodiode 11 calls for excessive light due to some circuit malfunction. Control point potentiometer 30 sets the normal range or center point for the lamp in that it determines the output of operational amplifier 29 for the reference condition, namely clean oil and maximum light transmission (i.e., minimum attenuation) to photodiode 11. The output of operational amplifier 29 therefore establishes the reference conducting condition of control transistor 34 and the reference lamp supply voltage and hence the light output from photodiode lamp 9.

In normal operation the oil monitor is immersed in a clean oil sample so that maximum light from lamp 9 reaches photodiode 11. The output of photodiode 11 is therefore a maximum negative current since there is minimum attenuation of the light. As the output of photodiode 11 is applied to the inverting terminal of operational amplifier 28, the output of the operational amplifier 28, the output of the operational amplifier 28 is positive. The output from operational amplifier 28 is in turn applied to the non-inverting terminal of operational amplifier 29 and the output for the reference or clean oil condition of operational amplifier 29 is determined by the voltage difference at its inverting and non-inverting terminals. The output of operational amplifier 29 for the reference condition is a negative voltage of relatively low value which is applied to the base PNP transistor 34 to establish a reference supply voltage to lamp 9. If the oil becomes darker due to thermal degradation of the oil or because the oil is sludging, the light transmitted to the oil is attenuated and the amount of light reaching photodiode 11 decreases. The output of photodiode 11 which was hitherto a maximum negative current is reduced so that the magnitude of the negative current applied to the inverting terminal of operational amplifier 28 is also reduced. Consequently, the output of operational amplifier 28 is applied also to the non-inverting terminal of operational amplifier 29 and causes the output of operational amplifier 29 to become more negative. The voltage applied to the base electrode PNP controls transistor 34 also becomes more negative and transistor 34 conducts more heavily increasing the voltage applied to lamp 9. As the voltage applied to lamp 9 is increased the intensity of the light increases correspondingly and consequently, the light intensity in the scatter field of view and the illumination level of photodiode 11 is maintained at a constant level even though the light transmission characteristic of the oil has changed.

The degree of light attenuation, i.e., the degree of opaqueness of the oil, may be determined indirectly from the loop control voltage required to maintain constant illumination of the scatter field of view and of photodiode 11. To this end, the output from control transistor 34 is also coupled to the light attenuation measurement path 23 to provide an output signal which is displayed as a measure of the degree of light attenuation in the oil. The output from PNP transistor 34 is therefore applied to the inverting input of an operational amplifier 35 along with a positive reference signal from an Attenuation-Zero setting potentiometer 36. With the monitor inserted in a reference sample, the setting of potentiometer 36 is adjusted so that the output of operational amplifier 35 is zero. Meter 26 forming part of the display circuit 25 is thus set at zero reading for the reference sample indicating that transmission is maximum and attenuation is minimum. As the oil being tested becomes darker so that the attenuation increases, closed loop 22 drives transistor 34 harder to increase the supply voltage to lamp 9 to maintain the illumination of photodiode 11 constant. As a result, the voltage at the emitter of transistor becomes more negative. As this voltage becomes more negative, the output of operational amplifier goes positive since these control signals apply to the inverting terminal of the amplifier. That is, as the signal becomes more negative, the total voltage at the inverting terminal, i.e., the control voltage as well as the reference voltage from potentiometer 36 becomes negative so that the output of the operational amplifier goes positive by an amount proportional to the increase in the supply voltage, which in turn, is proportional to the amount of attenuation. As a result, with the positive voltage at output 35, the pointer of meter 26 is driven upscale indicating an increase in attenuation.

Operational amplifier 35 is provided with a span control which allows changes in the gain of the amplifier to permit readout to any convenient scale. Thus, the RC feedback network between the output and the inverting terminal of operational amplifier 35 includes a fixed resistor 38 and a variable resistor 40 with the variable resistor being adjusted to control the gain or sensitivity of the amplifier to permit variation in the scale readings for different ranges of attenuation.

Scatter signal channel 24 includes an operational amplifier 42 connected to the output of scatter photodiode 14. The grounded output of photodiode 14 is connected to the non-inverting terminal of the operational amplifier whereas the remaining output is connected to the inverting terminal. The output from operational amplifier 42 is applied to the non-inverting input terminal of operational amplifier 43 which also has applied thereto a reference signal from the Scatter Circuit-Zero setting potentiometer 44. The reference signal from potentiometer 44 establishes the zero set point for meter 26 for scattered light when the monitor is inserted in the reference oil sample. That is, the positive signal from potentiometer 44 is combined with the signal from operational amplifier 42 to produce an output signal from operational amplifier 43 which produces zero reading on meter 26 when the probe is immersed in the reference sample and the meter is connected to the output of the scatter channel 24. The gain of operational amplifier 43 may be varied selectively to change the range of scatter particle concentration which may be measured by meter 26. To this end, the feedback path between the output and the inverting terminal of operational amplifier 43 may be selectively controlled to vary the gain of the amplifier. The RC feedback network includes a fixed resistor 45 which may be selectively connected through multi-position switch 46 to lead 47 or to resistors 48 and 49. The gain of operational amplifier 43 may thus be selectively varied to provide differing ranges for the particle concentration. The output of amplifier 43 is coupled through potentiometer 50 to one terminal of multi-position switch 27. Switch 27 may thus be connected to one terminal which couples the meter to scatter signal channel 24 or to a second terminal which connects it to the attenuation signal channel 23 or alternatively to yet a third terminal which is connected to the output of operational amplifier 28 in lamp voltage control loop 22 to provide an indication of a reference output for a clean oil sample. That is, closed lamp control loop 22 maintains the output of operational amplifier 28 relatively constant even as the opacity of the oil varies since the illumination level of the photodiode 11 is maintained at a constant level established by the reference sample. By connecting switch 27 to the output of operational amplifier 28, an indication is obtained on meter 27 of the attenuation level for the reference oil sample. The relative change in light attenuation of the oil being monitored may thus be easily determined. That is, since it is often desirable to utilize an oil monitor for detecting trends in oil contamination rather than absolute values, changes in monitor output, indicating an increasing degree of thermal degradation or sludging of the oil is more important from the standpoint of noting changes in conditions which require preventive maintenance than obtaining absolute values.

In calibrating the scatter signal channel of the device, the monitor is dipped into a clean, reference oil sample which is free of particles so that there is no light scattering and no light impinges on photodiode 14. The output of the photodiode 14 is therefore at a minimum and is essentially the dark current of the photodiode. The output of operational amplifier 42 is therefore at a low level. By setting scatter zero setting potentiometer 44 at the proper level, meter 26 is set at zero light scatter (and particle concentration) for the reference sample. As the particle concentration increases, more and more light is scattered by the particles and impinges on photodiode 14. The output current from photodiode 14 therefore increases to provide an increasingly negative current which is applied to the inverting terminal of operational amplifier 42 and the output of operational amplifier 42 becomes more positive. Operational amplifier 43 also becomes more positive since the output of amplifier 42 is connected to the non-inverting terminal of amplifier 43. Thus, with the particle concentration increasing the output of operational amplifier 43 becomes more and more positive thereby applying a positive voltage to meter 26 driving the pointer upscale by an amount proportional to the scattered light which in turn, is proportional to the particle concentration in the oil. It can thus be seen that the meter can readily be calibrated to show the particle concentration as a function of the scattered light.

In describing the calibration of the probe, the reference sample has, for the sake of simplicity of explanation, been described as a clean oil sample (i.e., as it comes from the manufacturer) which is free of particles. It is obvious that the invention is not limited thereto and the system may be calibrated to read zero attenuation and scattering for any reference opacity level and for any predetermined reference particle concentration. In fact, it may be preferable to do so since in normal operating circumstances it may be desirable to measure particle concentration increases and changes in opacity beyond a predetermined, normal, acceptable level.

In one specific embodiment of the instant invention the infrared emitting lamp was a gallium arsenide, solid state, infrared emitting diode lamp sold by the General Electric Company under its designation SSL-55C. This lamp produces a beam of infrared in a narrow 20° cone having a wave length of 940 nanometers (i.e., 94 microns). The SSL-55C infrared solid state lamp is quite small having an overall maximum length of 0.24 inches and a maximum diameter of 0.230 inches and produces an infrared emission in a wave length which is particularly suitable for optimal transmission through engine oil. Photodiodes 11 and 14 are silicon planar PIN photodiodes of the type manufactured by the Hewlett Packard Corporation under their designation 5082-4204 for diode 11 and 5082-4207 for diode 14.

It will be apparent from the foregoing discussion that an oil monitoring assembly has been provided which is simple in construction, easily portable and may be utilized to monitor oil contamination by directly inserting the monitoring assembly in the oil to be tested. The system is further characterized by the fact that both the degree of thermal degradation or sludging of the oil as manifested by its change in opacity and light transmitting characteristics may be measured as well as determining the particle concentration by light scattering techniques. The thermal degradation characteristics are measured in an indirect manner by measuring the increase in lamp voltage necessary to maintain constant illumination of the photodiode. In addition, by varying the light intensity to maintain constant illumination of the attenuation photodiode, errors in measuring particle concentration due to changes in opacity of the oil are avoided or entirely eliminated.

It can thus be seen that a compact, highly effective oil monitoring assembly has been provided which may be easily utilized to monitor the contamination in the oil stream of turbine engine to determine both thermal degradation of the oil as well as ascertaining the rate of wear in the engine through a measurement of the wear debris carried off by the lubricating oil for the engine.

Although a particular embodiment of the instant invention has been described, it will, of course, be understood that the invention is not limited thereto since many modifications both in circuit arrangement and in the instrumentalities employed may be made. It is contemplated by the appended claims to cover any such modifications as fall within the true spirit and scope of the invention.

What is claimed as new and desired to be secured by Letters Patent of the United States is:

1. A monitor for simultaneously measuring the particle concentration in a liquid and the opacity of the liquid, comprising,
   a. a body adapted for immersion in a liquid and having means defining a passage for receiving a liquid to be monotored;
   b. a source of radiation positioned in said body for transmitting a beam of radiant energy through said liquid in said passage;
   c. a first radiation detection means for receiving radiant energy transmitted through said liquid;
   d. a further radiation detection means positioned for receiving radiation scattered by particles suspended in said liquid;
   e. means responsive to output from said first radiant energy detection means for varying the output from said radiation source as a function of the transmission characteristics of said liquid to maintain the intensity of the radiation in the scatter field of view of said further radiation detection means and at said first radiation detection means constant with changes in the opacity of said liquid;
   f. means to measure the transmission characteristics of said liquid indirectly including means for producing a signal in response to the change in output from said radiant energy source as a measure of the opacity of the liquid;
   g. means responsive to the output from said further radiation for measuring the particle concentration.

2. The monitor according to claim 1 wherein the means for varying the output from said radiation source includes a control loop coupled between said first radiation detection means and said source of radiation for varying the supply voltage to said source.

3. The monitor according to claim 2 wherein said control loop includes a voltage supply for said source of radiation, means responsive to the output from said first radiation detecting means for varying the magnitude of the supply voltage to said source as a function of the attenuation in said liquid to maintain the illumination of the said scatter field of view and at said first radiation detector constant with changes of opacity of said liquid.

4. The monitor according to claim 3 wherein said loop includes means to produce a control signal as a function of the attenuation in said liquid, means for varying the magnitude of said supply voltage in response to said control signal to vary the output from said radiation source with changes in opacity.

5. The monitor according to claim 4 including means for measuring the supply voltage to said radiation source to provide a measure of the transmission characteristics and opacity of said liquid.

6. The monitor according to claim 2 wherein said source of radiation is a solid state, infrared emitting diode for transmitting infrared radiation through oil to measure the opacity of the oil and the particle concentration in said oil.

7. A monitor for indirectly measuring the opacity of a liquid comprising,
  a. a body adapted for immersion in a liquid and having means defining a passage for receiving liquid to be monitored;
  b. a source of radiation positioned in said body and communicating with said passage for transmitting a beam of radiant energy through said liquid;
  c. radiation detection means for receiving radiant energy transmitted through said liquid;
  d. means for varying the output from said source of radiation as a function of the transmission characteristics of said liquid including a control loop for varying the supply voltage to said radiation source in response to the output of said detection means to maintain the illumination at said detection means constant with changes in the opacity of the liquid; and
  e. means to measure the supply voltage to said radiation source to provide an indication of the transmission characteristic and opacity of said liquid.

8. The monitor according to claim 7 wherein said source of radiation is a infrared emitting diode for transmitting infrared radiation through oil to measure the opacity of the oil.

* * * * *